US010328802B2

(12) United States Patent
Gaither et al.

(10) Patent No.: US 10,328,802 B2
(45) Date of Patent: Jun. 25, 2019

(54) SYSTEMS AND METHODS FOR ADAPTIVE BRAKING USING BRAKE WEAR DATA

(71) Applicant: Toyota Motor Engineering & Manufacturing North America, Inc., Erlanger, KY (US)

(72) Inventors: Geoffrey David Gaither, Brighton, MI (US); Joshua D. Payne, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 241 days.

(21) Appl. No.: 15/349,676

(22) Filed: Nov. 11, 2016

(65) Prior Publication Data

US 2018/0134161 A1 May 17, 2018

(51) Int. Cl.
| B60L 3/00 | (2019.01) |
| B60L 7/18 | (2006.01) |
| B60L 7/26 | (2006.01) |
| B60T 17/22 | (2006.01) |
| B60T 8/172 | (2006.01) |

(52) U.S. Cl.
CPC ............... *B60L 7/26* (2013.01); *B60L 3/0076* (2013.01); *B60L 7/18* (2013.01); *B60T 8/172* (2013.01); *B60T 17/22* (2013.01); *B60L 2250/26* (2013.01); *B60T 2210/36* (2013.01); *B60T 2270/406* (2013.01); *B60T 2270/604* (2013.01); *Y10S 903/947* (2013.01)

(58) Field of Classification Search
None
See application file for complete search history.

(56) References Cited

U.S. PATENT DOCUMENTS

| 5,505,527 | A | * | 4/1996 | Gray, Jr. ................. | B60K 6/00 180/165 |
| 5,615,933 | A | * | 4/1997 | Kidston ................. | B60L 3/102 180/65.1 |
| 5,647,647 | A | * | 7/1997 | Kato ....................... | B60T 7/22 303/122.09 |
| 7,694,555 | B2 | * | 4/2010 | Howell ................. | B60T 17/221 73/129 |
| 7,971,666 | B2 | * | 7/2011 | Yamazaki ............. | B60W 20/13 180/65.265 |

(Continued)

*Primary Examiner* — Nicholas K Wiltey
(74) *Attorney, Agent, or Firm* — Christopher G. Darrow; Darrow Mustafa PC

(57) ABSTRACT

System, methods, and other embodiments described herein relate to adapting a manner of braking according to brake wear of friction brakes of a vehicle. In one embodiment, a method includes identifying whether brake wear of at least one of the friction brakes satisfies a threshold for modifying a deceleration pattern of the vehicle. The deceleration pattern indicates how regenerative brakes and the friction brakes are engaged to decelerate the vehicle individually for each wheel of the vehicle. The method includes adjusting the deceleration pattern according to at least the brake wear of the at least one of the friction brakes to transition braking from the at least one of the friction brakes to the regenerative brakes. The method includes controlling the vehicle to decelerate according to the deceleration pattern upon receiving a control input.

20 Claims, 6 Drawing Sheets

(56) References Cited

U.S. PATENT DOCUMENTS

| | | | |
|---|---|---|---|
| 8,135,526 B2 * | 3/2012 | Minarcin | B60W 10/02 701/70 |
| 8,315,751 B2 * | 11/2012 | Krueger | B60L 7/26 701/22 |
| 8,366,210 B2 * | 2/2013 | Maki | B60K 6/445 303/151 |
| 8,643,483 B2 | 2/2014 | Oh et al. | |
| 8,874,305 B2 * | 10/2014 | Dolgov | G06T 7/223 701/31.9 |
| 8,874,344 B2 * | 10/2014 | Aldighieri | B60T 1/10 701/70 |
| 9,260,087 B2 * | 2/2016 | Aldrich, III | B60L 7/10 |
| 9,353,815 B1 * | 5/2016 | Eden | F16D 66/027 |
| 2002/0104717 A1 * | 8/2002 | Borugian | B60T 17/221 188/1.11 E |
| 2004/0164612 A1 * | 8/2004 | Worrel | B60L 7/26 303/177 |
| 2005/0052080 A1 * | 3/2005 | Maslov | B60L 8/00 307/10.1 |
| 2006/0001314 A1 * | 1/2006 | Teslak | B60K 6/12 303/152 |
| 2006/0196712 A1 | 9/2006 | Toyota et al. | |
| 2008/0129110 A1 * | 6/2008 | Jager | B60L 7/24 303/152 |
| 2009/0118888 A1 * | 5/2009 | Minarcin | B60K 6/26 701/22 |
| 2010/0275593 A1 * | 11/2010 | Okada | B60T 13/162 60/545 |
| 2012/0078481 A1 * | 3/2012 | Aldrich, III | B60L 7/10 701/70 |
| 2012/0136547 A1 * | 5/2012 | Miyazaki | B60T 1/10 701/70 |
| 2012/0241264 A1 * | 9/2012 | Hosaka | B60L 7/14 188/156 |
| 2013/0261890 A1 * | 10/2013 | Roberts | F16D 65/568 701/36 |
| 2013/0262067 A1 * | 10/2013 | Zhang | G01R 31/3651 703/8 |
| 2013/0268162 A1 * | 10/2013 | Ponziani | B60W 30/00 701/48 |
| 2014/0074345 A1 * | 3/2014 | Gabay | G07C 5/008 701/31.4 |
| 2016/0200295 A1 * | 7/2016 | Nishikawa | B60T 1/10 701/70 |
| 2016/0305502 A1 * | 10/2016 | Eden | F16D 66/027 |
| 2016/0363182 A1 * | 12/2016 | Eden | F16D 66/024 |
| 2017/0082163 A1 * | 3/2017 | Serra | F16D 66/00 |
| 2018/0029583 A1 * | 2/2018 | Dieckmann | B60T 13/662 |
| 2018/0038435 A1 * | 2/2018 | Huang | F16D 65/125 |
| 2018/0093572 A1 * | 4/2018 | Hall | B60T 1/10 |
| 2018/0107932 A1 * | 4/2018 | Pandurangarao | B60W 40/09 |
| 2018/0134261 A1 * | 5/2018 | Akita | B60T 7/042 |
| 2018/0134276 A1 * | 5/2018 | Zhao | B60L 7/26 |
| 2018/0223935 A1 * | 8/2018 | Eden | F16D 66/024 |

* cited by examiner

SYSTEMS AND METHODS FOR ADAPTIVE BRAKING USING BRAKE WEAR DATA

TECHNICAL FIELD

The subject matter described herein relates in general to systems and methods for adapting regenerative braking according to brake wear patterns.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Hybrid vehicles and fully electric vehicles (EVs) use regenerative braking to recapture energy that is otherwise lost/dissipated as heat when using a friction brake (e.g., hydraulic disc brake). However, the regenerative brakes are generally not sufficient to fully slow the vehicle and/or to slow the vehicle at an appropriate rate in emergency circumstances. This is because, at least in part, regenerative brakes are less effective at lower speeds. Accordingly, hybrid and electric vehicles generally include both types of brake systems. Additionally, a single brake pedal is used to control both brake systems as though they are one in order to seamlessly integrate the systems together for ease of operation by the driver.

Consequently, the braking system may initially engage the regenerative brakes to slow the vehicle, then blend the use of the regenerative brakes with the friction brakes before finally switching completely to the friction brakes to stop the vehicle. However, the system fails to account for wear of brake pads/rotors in the friction braking system that occurs over time. Accordingly, the driver may perceive variances in brake pedal stroke and torque as the friction brakes experience wear. These perceived variances can cause the driver to manually adapt a braking style resulting in potentially limiting regenerative braking. Therefore, recovered charge and, thus, vehicle range may be diminished in addition to added wear on the friction brakes from strong brake pedal stroke inputs from the driver.

SUMMARY

An example of an adaptive control system for a vehicle is presented herein. The adaptive control system can use various information from sensors of the vehicle to identify wear of friction brakes that occurs over time. Using information about the brake wear, the adaptive control system can adapt a manner by which the vehicle decelerates. For example, in one embodiment, the adaptive control system adjusts braking by activating regenerative brakes to a greater degree, at least in part, in place of activating the friction brakes. In this way, the adaptive control system can compensate for brake wear and/or lengthen brake life of the friction brakes.

In one embodiment, an adaptive control system of a vehicle that includes both regenerative brakes and friction brakes is disclosed. The adaptive control system includes one or more processors and a memory communicably coupled to the one or more processors. The memory stores a brake wear module including instructions that when executed by the one or more processors cause the one or more processors to identify whether brake wear of at least one of the friction brakes satisfies a threshold for modifying a deceleration pattern of the vehicle. The deceleration pattern indicates how the regenerative brakes and the friction brakes are engaged to decelerate the vehicle individually for each wheel of the vehicle. The memory also includes a deceleration module including instructions that when executed by the one or more processors cause the one or more processors to adjust the deceleration pattern according to at least the brake wear of the at least one of the friction brakes to transition braking from the at least one of the friction brakes to the regenerative brakes. The deceleration module includes instructions to control the vehicle to decelerate according to the deceleration pattern upon receiving a control input.

In one embodiment, a non-transitory computer-readable medium is disclosed. The computer-readable medium stores instructions that when executed by one or more processors cause the one or more processors to perform the disclosed functions. The instructions include instructions to identify whether brake wear of at least one of the friction brakes satisfies a threshold for modifying a deceleration pattern of a vehicle. The deceleration pattern indicates how regenerative brakes and friction brakes are engaged to decelerate the vehicle individually for each wheel of the vehicle. The instructions include instructions to adjust the deceleration pattern according to at least the brake wear of the at least one of the friction brakes to transition braking from the at least one of the friction brakes to the regenerative brakes. The instructions include instructions to control the vehicle to decelerate according to the deceleration pattern upon receiving a control input.

In one embodiment, a method of adapting braking in a vehicle that includes both regenerative brakes and friction brakes is disclosed. The method includes identifying whether brake wear of at least one of the friction brakes satisfies a threshold for modifying a deceleration pattern of the vehicle. The deceleration pattern indicates how regenerative brakes and the friction brakes are engaged to decelerate the vehicle individually for each wheel of the vehicle. The method includes adjusting the deceleration pattern according to at least the brake wear of the at least one of the friction brakes to transition braking from the at least one of the friction brakes to the regenerative brakes. The method includes controlling the vehicle to decelerate according to the deceleration pattern upon receiving a control input.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
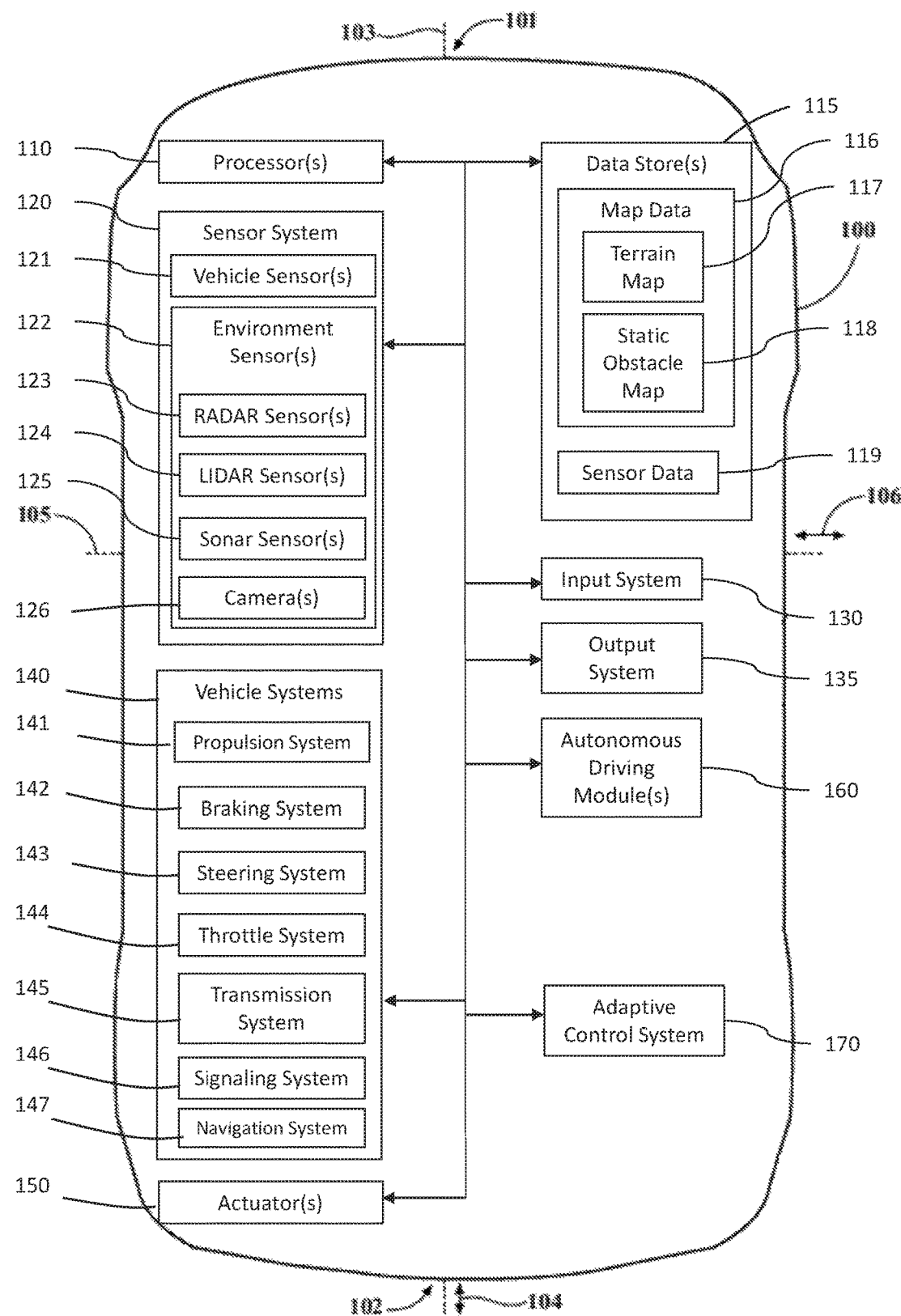
FIG. 1 illustrates one embodiment of a vehicle within which systems and methods disclosed herein may be implemented.

Systems, methods and other embodiments associated with adapting regenerative braking according to brake wear are disclosed herein. As mentioned in the background, both hybrid and fully electric vehicles may employ friction brakes along with regenerative brakes so that energy used to propel the vehicle can be at least partially recovered when braking. Many different approaches may be implemented in relation to how the regenerative brakes are applied (e.g., when and to what extent). However, because the regenerative brakes are generally less effective at slowing the vehicle at lower speeds and also generate less power at lower speeds, the friction brakes are activated once a lower speed threshold is surpassed. In some circumstances, the vehicle may blend use of the regenerative brakes and the friction brakes to achieve improved braking while still recovering energy or may use just the regenerative brakes to initially slow the vehicle.

In either case, as the friction brakes experience wear from repeated use over time, the performance of the friction brakes declines. That is, for example, as brake pads and/or rotors of the friction brakes experience wear, a deceleration force produced when the brake pedal is depressed to a same position degrades. This degradation in performance of the friction brakes means that a deceleration pattern becomes less effective at controlling the vehicle to decelerate as originally intended. Additionally, the brake wear may also cause changes in how the brake pedal feels to the driver when depressed. This combination of circumstances can adversely affect the confidence of the driver and, thus, may lead to dangerous driving conditions. Moreover, changes in braking patterns of the driver induced by the change in brake pedal feel may result in the use of less regenerative braking by the driver.

Therefore, in one embodiment, the vehicle is equipped with an adaptive control system that dynamically adjusts the deceleration pattern according to a present condition of the brakes. For example, the vehicle may be equipped with sensors to measure wear of the brake pads, a monitoring component to track use of the friction brakes, acceleration sensors that identify an amount of braking force in relation to brake pedal stroke, and/or other means of assessing an amount of brake wear of the friction brakes. The adaptive control system uses the information about the brake wear to adjust activation of the regenerative brakes to compensate for the brake wear.

That is, once the brake wear surpasses a threshold (e.g., 25% reduction in brake pad thickness), the adaptive control system can increase an amount (i.e., longevity and/or degree) by which the vehicle activates the regenerative brakes so that the vehicle decelerates in a consistent manner as the performance of the friction brakes changes according to the brake wear. In this way, the adaptive control system dynamically adjusts the deceleration pattern of the vehicle to improve braking through increased brake life, improved energy regeneration, improved consistency and so on.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport with a similar braking configuration.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced various combinations of these elements.

In either case, the vehicle 100 includes an adaptive control system 170 that is implemented to perform methods and other functions as disclosed herein relating to dynamically adjusting a braking system 142 within the vehicle 100 to compensate for a present condition of the friction brakes 280. The noted functions and methods will become more apparent with further discussion of the figures.

Figure 2:
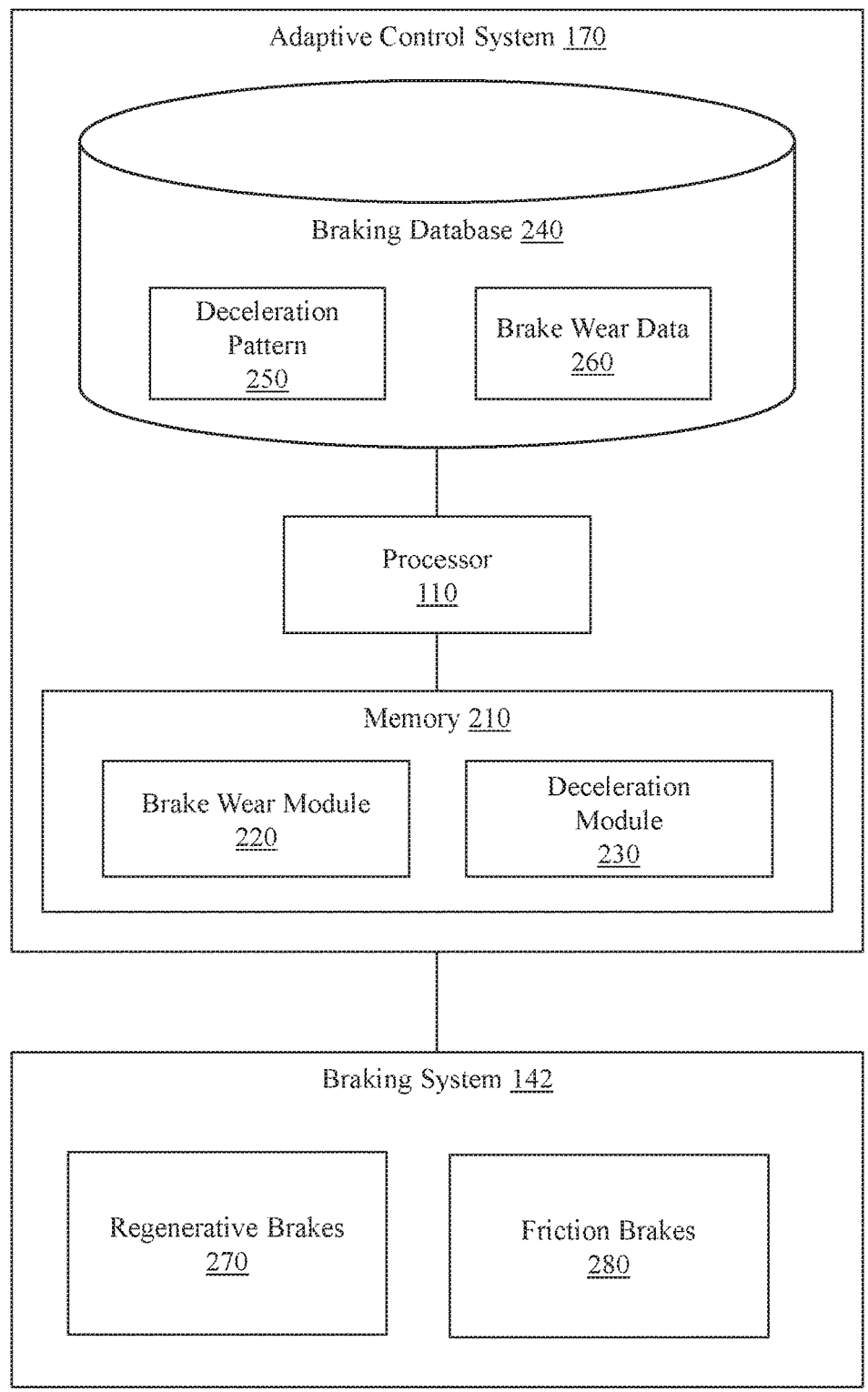
FIG. 2 illustrates one embodiment of an adaptive control system that is associated with dynamically adapting a deceleration pattern according to brake wear.

With reference to FIG. 2, one embodiment of the adaptive control system 170 of FIG. 1 is further illustrated. The adaptive control system 170 is shown as including the processor 110 from the vehicle 100 of FIG. 1. Accordingly, the processor 110 may be a part of the adaptive control system 170 or the adaptive control system 170 may include a separate processor from the processor 110 of the vehicle 100. In one embodiment, the adaptive control system 170 includes a memory 210 that stores a brake wear module 220 and a deceleration module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

The adaptive control system 170 also includes a braking database 240. The braking database 240 is, in one embodiment, a complex electronic data structure stored in a memory (not illustrated) that is configured with routines for analyzing stored data, providing stored data, organizing stored data, and so on. Thus, in one embodiment, the braking database 240 stores the deceleration pattern 250 and brake wear data 260 for access by the processor 110 when executing the modules 220 and 230. The deceleration pattern 250, which will be discussed in greater detail subsequently, is generally comprised of control data that dictates how the braking system 142 activates the regenerative brakes 270 and the friction brakes 280 to decelerate the vehicle 100. In one embodiment, the deceleration pattern 250 indicates when each of the brakes 270 and 280 are engaged and an amount by which each of the brakes 270 and 280 are engaged according to at least a current speed of the vehicle 100.

Furthermore, the braking database 240 also stores the brake wear data 260 that includes, for example, lookup tables of intermediate wear values, an accumulated brake wear for each of the friction brakes 280, historic brake wear values for each braking event, and so on. In one embodiment, the lookup tables indicate an amount of brake wear for a particular braking event. That is, the lookup tables are a collection of lookup tables with separate tables for different operating conditions such as brake age, ambient air temperature, and so on. Accordingly, a particular one of the lookup tables includes estimated brake wear values according to characteristics of a braking event.

As one example, when a braking event occurs, the brake wear module 220 records various information about the braking event such as brake pedal stroke, duration, ambient air temperature, and so on. The brake wear module 220 uses the information about the braking event as an input to select a relevant lookup table and retrieve an intermediate brake wear value for the braking event from the selected lookup table. In one embodiment, the brake wear module 220 uses the intermediate brake wear value to update an overall brake wear value of the friction brakes 280 that is also stored in the braking database 240 as part of the brake wear data 260. Still, in a further embodiment, the brake wear module 220 assigns an amount of brake wear from the braking event individually to each of the friction brakes 280 using the deceleration pattern 250 and the intermediate wear value from the lookup table.

In either case, the brake wear module 220 generally includes instructions that function to control the processor 110 to determine aspects relating to wear of the friction brakes 280. In other words, the brake wear module 220 includes instructions to determine at least a degree of brake wear that presently exists in relation to various components (e.g., brake pads and/or rotors) of the friction brakes 280. Additionally, in one embodiment, the deceleration module 230 uses the information determined by the brake wear module 220 to dynamically adapt the deceleration pattern 250 of the vehicle 100 to, for example, compensate for the brake wear. Further aspects of determining brake wear and adjusting the deceleration pattern 250 will be discussed subsequently in relation to FIGS. 3-4.

Figure 3:
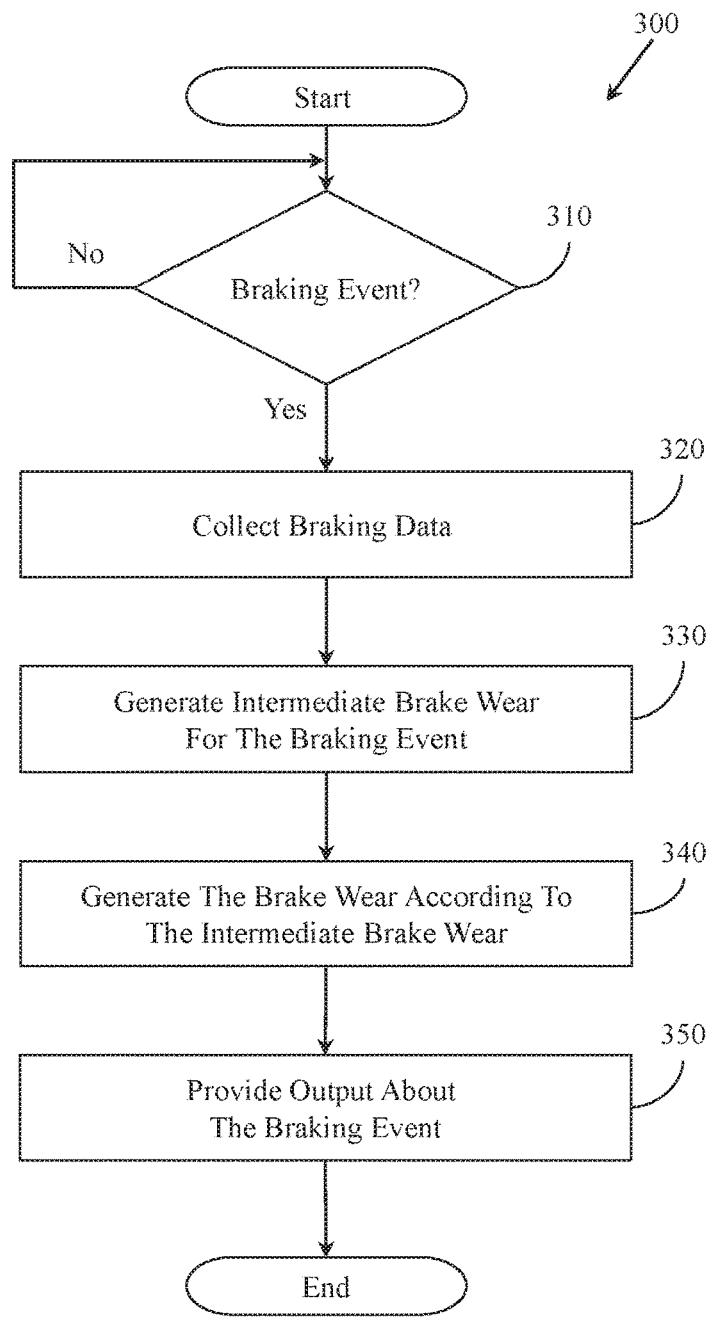
FIG. 3 illustrates one embodiment of a method that is associated with using braking event information to determine brake wear and provide indications to a driver about the brake wear for the braking event.

With reference to FIG. 3, one embodiment of a method 300 associated with identifying brake wear and learning wear patterns is illustrated. For purposes of brevity, the method 300 will be discussed in relation to the adaptive control system 170 of FIGS. 1 and 2. Of course, while method 300 is discussed in combination with the adaptive control system 170, it should be appreciated that the method 300 is not limited to being implemented within the adaptive control system 170, as outlined, but is instead one example of a system that may implement the method 300.

At 310, the brake wear module 220 detects a braking event. In one embodiment, a braking event, as used in relation to block 310, is intended to encompass a deceleration of the vehicle 100 in which the braking system 142 activates the friction brakes 280. Thus, as used in relation to block 310 the phrase braking event is construed in a narrower context since decelerations of the vehicle 100 may include instances that do not involve the friction brakes 280 such as an activation of the regenerative brakes 270 alone when, for example, coasting.

Consequently, in one embodiment, the brake wear module 220 continuously monitors the braking system 142 to detect when the friction brakes 280 are engaged. The brake wear module 220 can detect the braking event by, for example, monitoring control signals between the braking system 142 and the friction brakes 280, monitoring brake line pressure, or by another suitable means.

In either case, when a braking event is detected, at 320, the brake wear module 220 collects various braking data about the braking event. In one embodiment, the brake wear module 220 collects information about a brake pedal stroke (i.e., an amount by which the brake pedal is depressed) that is translated into a correlating torque applied by the friction brakes 280 at the wheels of the vehicle 100. The brake wear module 220 also collects information about a duration of the braking event, an ambient air temperature during the braking event, a speed of the vehicle 100, and so on. Of course, while a specific set of brake data is itemized for purposes of this discussion, different data may be collected depending on particular details of an implementation. Furthermore, the brake wear module 220 may be implemented to collect differing levels of granularity of the braking data, such as stroke over a time series or simply an average brake stroke depending on a precision of the implemented system.

In yet a further embodiment, the brake wear module 220 may also collect sensor data from brake wear sensors installed in the vehicle 100. The brake wear sensors may be proximity sensors, positional sensors, temperature sensors, electrical contact sensors, mechanical sensors, or another form of brake wear sensor. In either case, the brake wear module 220 is configured to receive a control signal from the brake wear sensor or some other indication that denotes a current degree of wear. Because the friction brakes 280 may be disc brakes, drum brakes, or some other form of friction brake, the brake sensor may indicate a brake pad thickness, a rotor condition, a brake temperature, and so on. Once the brake wear module 220 collects the braking data, the brake wear module 220 may store the braking data in the braking database 240, the memory 210, or another suitable memory (e.g., register). Thus, in one embodiment, the braking data may be collected into a history of braking data from previous braking events.

At 330, the brake wear module 220 analyzes the braking data to generate an intermediate brake wear. That is, in one embodiment, the brake wear module 220 uses the braking data collected at 320 to determine an amount of wear produced by the braking event, which is provided as a value (e.g., percentage of total brake pad thickness, millimeters of thickness in wear, etc.) representing the intermediate brake wear. Accordingly, the brake wear module 220 analyzes the braking event as a function of the collected braking data to generate the intermediate brake wear. In one embodiment, the brake wear module 220 uses the braking data to select a particular lookup table that correlates with the characteristics of the braking event, e.g., ambient air temperature, brake age, brake type and size, current speed and so on. Thereafter, the brake wear module 220 uses the brake pedal stroke (i.e., cumulative torque for the braking event) as an input to the selected lookup table. The brake wear module 220 obtains the intermediate brake wear as an output in the form of, for example, a thickness of the brake pad consumed by the braking event.

The lookup tables include, for example, data learned from past braking under similar circumstances across a large sample size that is programmed into the lookup tables as an estimate of expected brake wear for the detected conditions. Furthermore, values stored in the lookup tables may be dynamically modified according to learned characteristics of the particular driver of the vehicle 100 to refine the stored values according to trends learned from past braking events as stored in the brake wear data 260. Alternatively, in one embodiment, the brake wear module 220 may generate the intermediate brake wear procedurally. That is, the brake wear module 220 parameterizes the braking data and uses the parameterized braking data as an input to a function. In general, the function includes probabilistic elements learned by analyzing a braking history stored in the brake wear data 260 or defined from other sources. Consequently, the brake wear module 220 generates the intermediate brake wear as an output of executing the function using the collected braking data.

Additionally, the brake wear module 220 may individually determine wear separately for each of the friction brakes 280. In one embodiment, the brake wear module 220 receives separate intermediate values as a result of the analysis at block 330 or uses the intermediate value to calculate separate values for each of the friction brakes 280. In one embodiment, the brake wear module 220 uses the deceleration pattern 250 to apportion brake wear to each of the friction brakes 280 according to an extent of use indicated for each of the friction brakes 280 in the deceleration pattern 250. Furthermore, the brake wear module 220 may refine the intermediate brake wear using readings from the brake wear sensors.

At 340, the brake wear module 220 generates the degree of brake wear by accumulating the intermediate brake wear with a previous degree of brake wear that is present from prior to the braking event for each of the friction brakes 280. The brake wear module 220 may provide the brake wear separately for each of the friction brakes 280 and/or as a combined brake wear rating for all of the friction brakes 280 together. In either implementation, the updated brake wear is stored in the braking database 240 with the brake wear data 260 for use with subsequent braking events.

At 350, the brake wear module 220 provides an indication according to the intermediate brake wear. In general, the indication identifies an effect of the braking event on the friction brakes 280. In one embodiment, the brake wear module 220 displays the intermediate brake wear to a driver of the vehicle 100 to indicate an effect of the braking event on brake life. For example, the brake wear module 220 may compare the intermediate brake wear for the braking event against an expected or optimal brake wear. The brake wear module 220 may then display a deviation from the expected brake wear that characterizes how efficiently the driver used the brakes in relation to conserving brake life. Accordingly, in one embodiment, the intermediate brake wear may be displayed as part of a brake coaching system that provides real-time data to the driver about optimal braking techniques to conserve brake life and to optimize regenerative braking. In this way, the driver is made aware of how their braking style influences overall brake life.

Furthermore, the method 300 may continuously operate as a background process so that the braking events may be detected and logged. In this way, not only can the brake wear module 220 monitor the brake wear of the vehicle 100, but the brake wear module 220 can log a history of information about various braking events to learn how the driver's braking style effects the brake life and adjust the deceleration pattern 250 to improve a longevity of the brakes, as will be discussed in relation to FIG. 4. In this way, the brake wear module 220 can facilitate improvements in brake life longevity.

Figure 4:
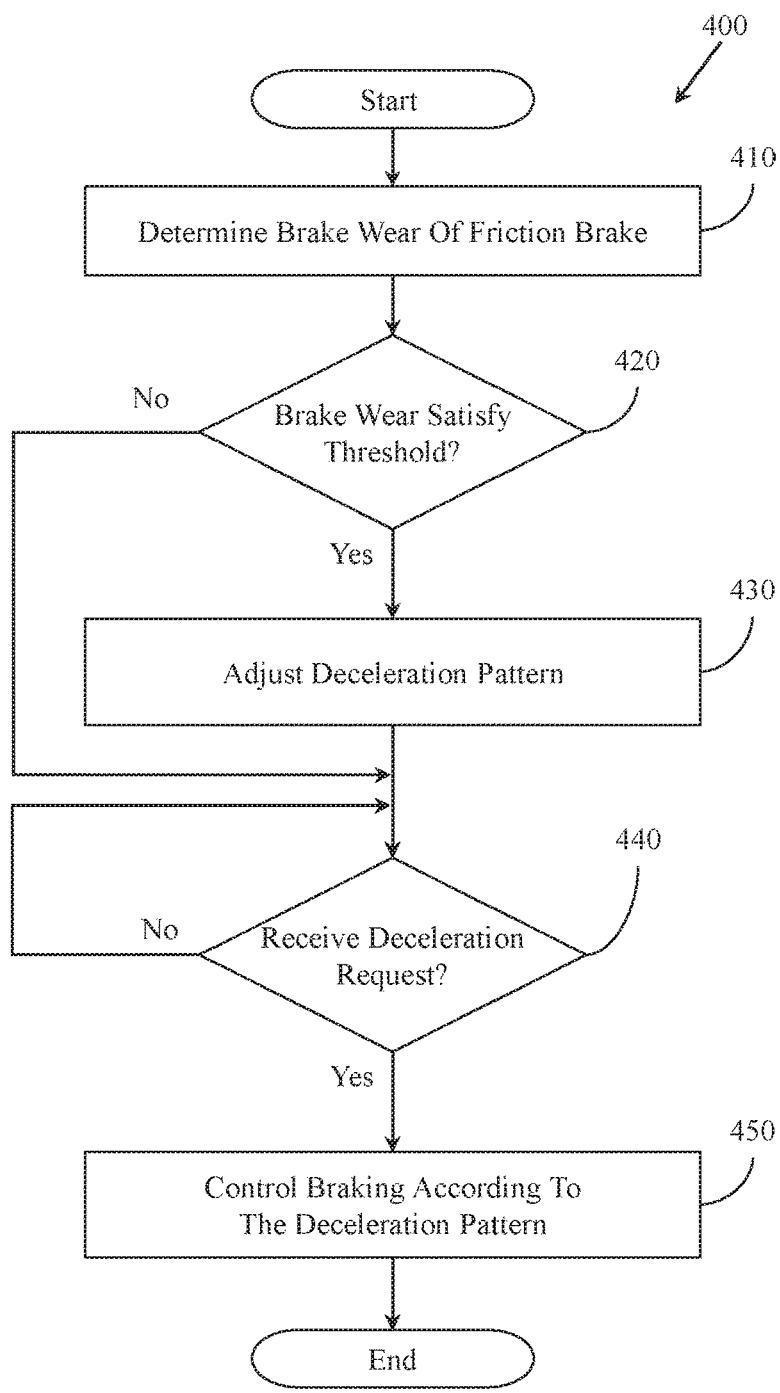
FIG. 4 illustrates one embodiment of a method that is associated with adapting a deceleration pattern according to determined brake wear.

Accordingly, FIG. 4 illustrates a method 400 associated with adapting a deceleration pattern according to determined brake wear. As discussed in relation to FIG. 3, the method 400 will also be discussed in relation to the adaptive control system 170 of FIGS. 1 and 2. Of course, while method 400 is discussed in combination with the adaptive control system 170, it should be appreciated that the method 400 is not limited to being implemented within the adaptive control system 170, as outlined, but is instead one example of a system that may implement the method 400.

At 410, the brake wear module 220 determines the brake wear associated with the friction brakes 280, as discussed previously in relation to the method 300. While the brake wear is generally discussed in relation to the friction brakes 280 together as a whole, of course, in one embodiment, the brake wear module 220 individually determines wear for each separate one of the friction brakes 280. In this way, the brake wear module 220 can track brake wear at a granularity of each of the specific friction brakes 280 associated with each separate wheel and can also adjust the regenerative braking separately at each wheel as will be discussed in greater detail subsequently.

At 420, the brake wear module 220 identifies whether brake wear of at least one of the friction brakes 280 satisfies a threshold. In one embodiment, the threshold is a percentage of wear in a thickness of a brake pad, rotor and/or another brake component. Alternatively, the threshold can be a defined amount (e.g., millimeters) of wear, an amount of wear in relation to an age of the friction brakes 280, and so on. In either case, the threshold indicates a point past which the deceleration pattern 250 is to be modified in order to compensate for wear to the friction brakes 280 or to facilitate an improved longevity of the friction brakes because of, for example, a particular braking style of the driver. Additionally, the threshold may be selected and defined according to a point at which the brake wear begins to noticeably impact performance or an effectiveness of the friction brakes 280. That is, once the threshold can be selected such that once the brake wear begins to influence performance, the regenerative brakes 270 can be engaged to compensate for the effects of the brake wear in order to provide consistent deceleration by the vehicle 100.

Thus, the brake wear module 220 compares the brake wear determined at 410 with the threshold to determine if the deceleration pattern 250 is to be modified at 430. If the brake wear does not satisfy the threshold, then the adaptive control system 170 proceeds to block 440 and awaits a subsequent deceleration request. However, if the threshold is satisfied, then the adaptive control system 170 proceeds to 430 where the deceleration module 230 adjusts the deceleration pattern 250. Moreover, once the brake wear has initially eclipsed the threshold and the deceleration pattern 250 is then adjusted at 440, the threshold may be adjusted for subsequent iterations of method 400. That is, the brake wear module 220 may adjust the threshold itself to a new value as a future target point at which further adjustments to the deceleration pattern 250 may be made. Alternatively, the threshold may be implemented as a continuum or sliding scale that is based on a current wear level of wear and is subsequently adjusted along with the deceleration pattern 250 as the friction brakes 280 continue to wear.

Furthermore, the brake wear module 220, in one embodiment, individually compares brake wear for each of the friction brakes 280 with the threshold. Thus, the deceleration pattern 250 is separately adjusted at 430 for ones of the friction brakes 280 that have satisfied the threshold. In this way, brake wear between the different friction brakes 280 can be balanced to provide an even distribution of wear and braking within the braking system 142.

In either case, at 430, the deceleration module 230 adjusts the deceleration pattern 250 according to at least the brake wear of one of the friction brakes 280. In general, the deceleration module 230 adjusts the deceleration pattern 250 to transition braking from the friction brakes 280 to the regenerative brakes 270, or from one of the friction brakes 280 to a corresponding one of the regenerative brakes 270. In one embodiment, the deceleration module 230 also indicates to a brake coaching system of the vehicle 100 how to coach a driver about when to coast and use the regenerative brakes 270. Thus, when the deceleration module 230 adjusts the deceleration pattern 250 at 430 to, for example, increase regenerative braking, then the changes are also reflected in how the brake coaching system instructs the driver to use the regenerative brakes. For example, the brake coaching system may indicate to the driver to begin coasting sooner and thus increase regenerating braking when the deceleration pattern 250 is similarly adjusted.

Figure 5:
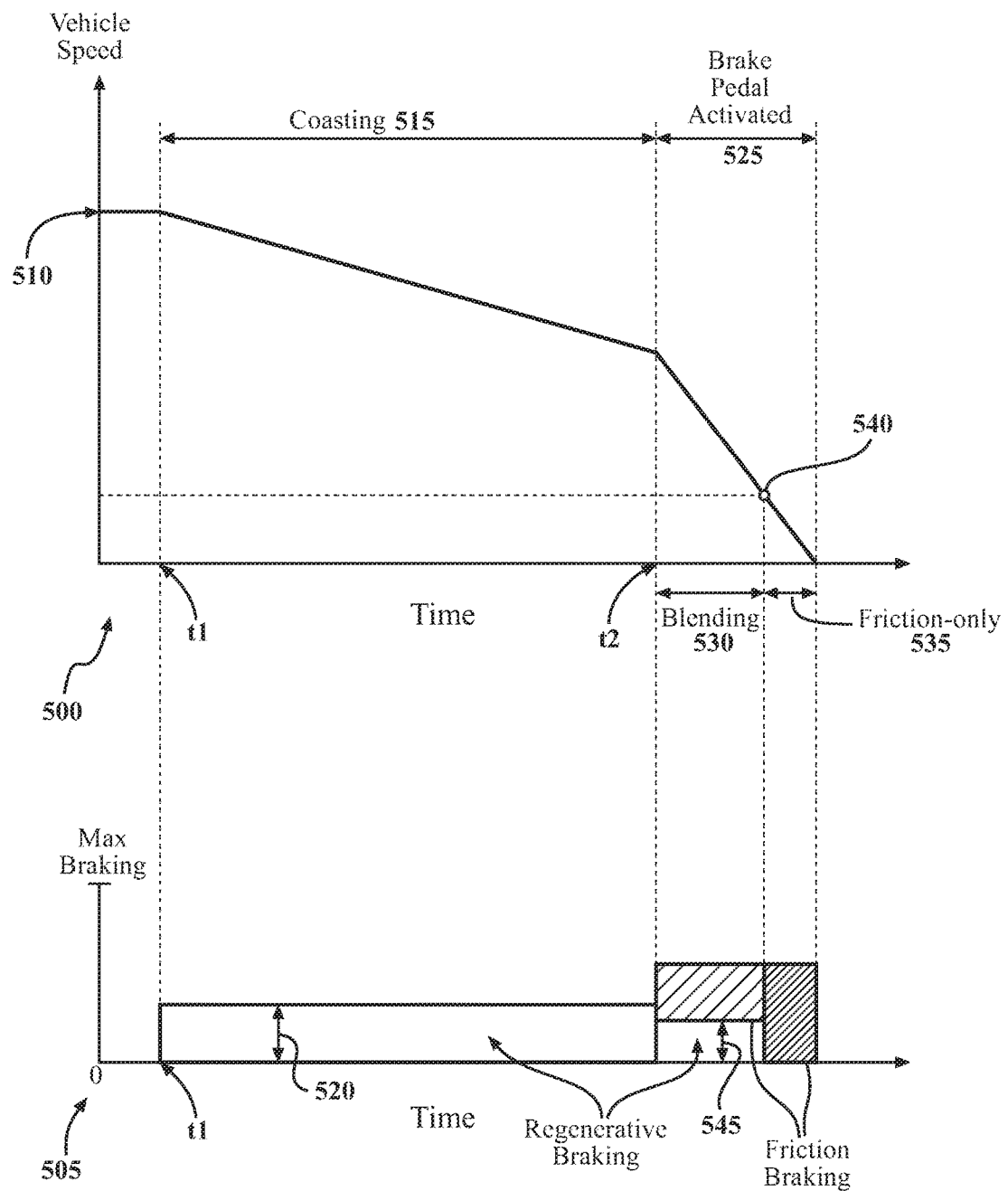
FIG. 5 illustrates example graphs of how the deceleration pattern is applied to control a vehicle to decelerate.

In general, the deceleration pattern 250 can indicate several separate aspects of how the friction brakes 280, and the regenerative brakes 270 are controlled to decelerate the vehicle 100. As an illustrative example, consider FIG. 5, which illustrates a speed graph 500 of how an example implementation of the deceleration pattern 250 controls activation of the regenerative brakes 270 and the friction brakes 280 to slow the vehicle 100. FIG. 5 also includes a brake apportionment graph 505 that illustrates how the deceleration pattern 250 is used to control activation of the regenerative brakes 270 and the friction brakes 280.

The speed graph 500 begins at time zero with the vehicle 100 traveling at a cruising speed 510. For purposes of this discussion, the cruising speed 510 represents a rate of travel of the vehicle 100 during which an accelerator pedal is depressed in order to maintain a constant speed or to accelerate, but no braking is occurring at 510. At time t1, the accelerator pedal is released, and the vehicle 100 enters a coasting period 515. The driver may release the accelerator pedal as instructed by, for example, the brake coaching system. During the coasting period 515, neither the accelerator pedal nor the brake pedal of the vehicle 100 is depressed. However, the adaptive control system 170 controls the braking system 142 to activate the regenerative brakes 270 according to an amount of torque 520 specified by the deceleration pattern 250. In one embodiment, the amount of torque 520 for regenerative braking may vary according to a speed of the vehicle 100 as specified by the deceleration pattern 250.

In either case, the adaptive control system 170 causes the regenerative brakes 270 to activate during the coasting period 515 without activating the friction brakes 280. However, at time t2, a brake pedal of the vehicle 100 is depressed transitioning the vehicle 100 into a braking period 525 of the deceleration pattern 250. The braking period 525 is comprised of two separate sections, a blending section 530 and a friction-only section 535. The adaptive control system 170 controls the braking system 142 to activate both the regenerative brakes 270 and the friction brakes 280 during the blending section 530. An amount/ratio for each type of braking in the blending section 530 is dictated by the deceleration profile 250. Additionally, a transition speed 540 that indicates a lower bound/threshold of speed where the braking switches from blended section 530 to friction-only braking 535 is also dictated by the deceleration profile 250.

Accordingly, at 440, the deceleration module 230 adjusts the deceleration pattern 250. In one embodiment, the deceleration module 230 can adjust one or more aspects of the deceleration pattern according to whichever is preferred or defined as a function of one or more aspects of the wear (e.g., present degree of wear, braking style, etc.). For example, the deceleration module 230 may modify one or more of the amount of torque 520 provided by the regenerative brakes 270 during the coasting period 515, an amount/ratio of torque 545 provided by the regenerative brakes 270 in comparison to the friction brakes 280 during the blending section 530, and/or lowering the transition speed 540 to a lower speed.

Alternatively, the deceleration module 230 adjusts one or more aspects of the deceleration pattern 250 according to a learned braking style of a driver of the vehicle 100. That is, based on learned braking behaviors of the driver such as strong braking late in the deceleration sequence, the deceleration module 230 may provide greater torque during the coasting period 515 to compensate for the late braking and wear on the friction brakes 280. Thus, depending on particular aspects of the learned braking style, the deceleration module 230 can adapt the deceleration pattern 250 differently to appropriately compensate and defer wear from the friction brakes 280. Furthermore, while the adjustments are discussed as a general adjustment in relation to the overall braking (i.e., all of the friction brakes 280 and the regenerative brakes 270 together), the deceleration module 230 may individually adjust the deceleration pattern 250 on a wheel-by-wheel basis, as previously mentioned.

Figure 6:
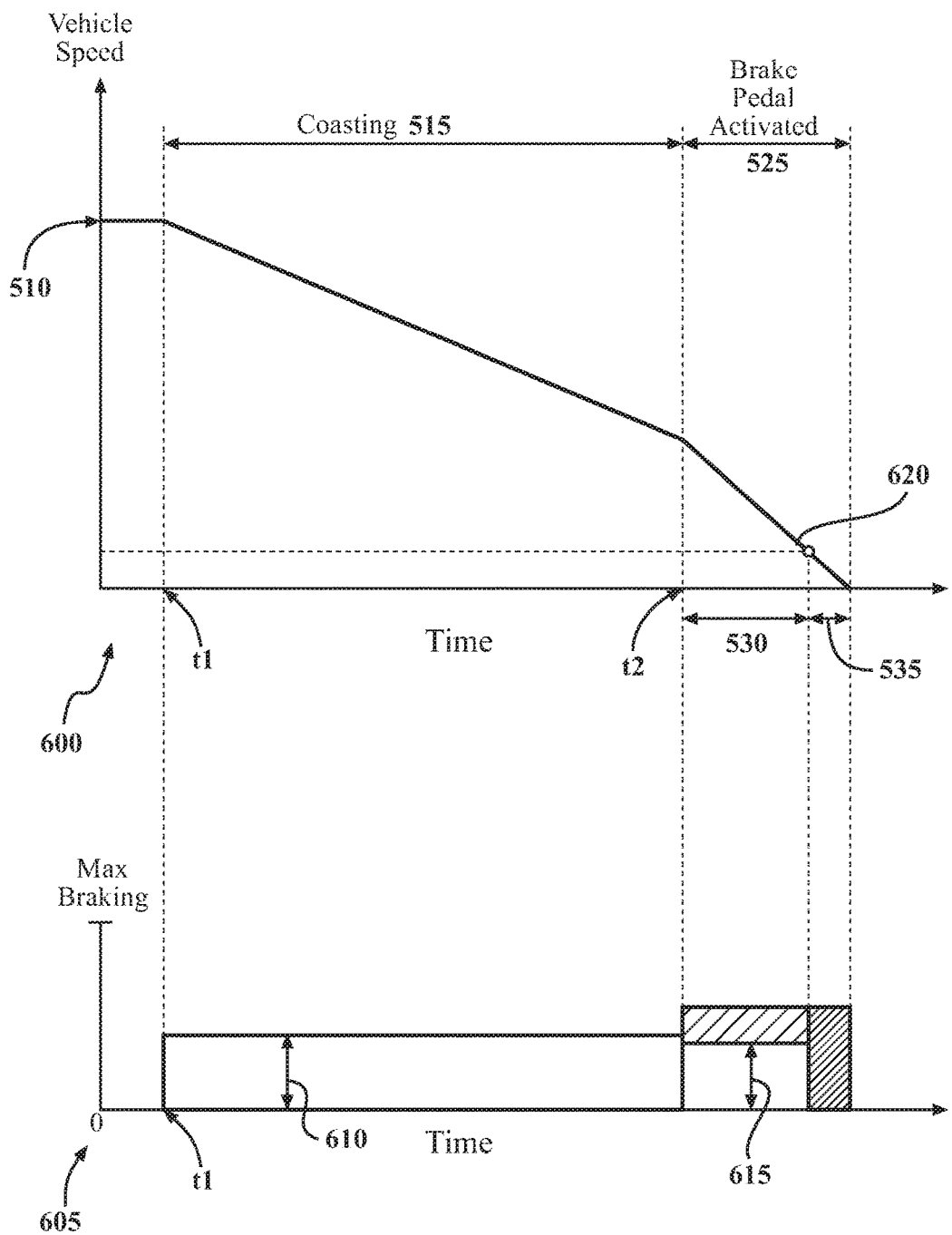
FIG. 6 illustrates example graphs of how an adjusted deceleration pattern is applied to control a vehicle to decelerate.

As one example, FIG. 6 illustrates a speed graph 600 of how an adjusted version of the deceleration pattern 250 controls activation of the regenerative brakes 270 and the friction brakes 280 to slow the vehicle 100. FIG. 6 also includes a brake apportionment graph 605 that illustrates how the deceleration pattern 250 is adjusted to control activation of the regenerative brakes 270 at least partially in place of the friction brakes 280 to compensate for brake wear.

As shown in FIG. 6, all three previously noted adjustments to the deceleration pattern 250 have been provided as an example of possible modifications to the deceleration pattern 250. Of course, in other examples, one, two, or all three of the adjustments may be made at a time depending on, for example, particular implementation details such as how to account for increasing levels of brake wear. In either case, FIG. 6 illustrates additional regenerative torque 610 in comparison to the regenerative torque 520 as evidenced by a greater negative slope of the coasting section 515 in FIG. 6.

Additionally, the amount of regenerative torque 615 is adjusted to be greater than the regenerative torque 545 provided during the blending section 530 while friction braking for the blending section 530 has been reduced thereby modifying a ratio of regenerative braking to friction braking while maintaining an overall level of torque. Lastly, the speed transition point 620 is adjusted to a lower speed than the transition point 540, which effects a duration of friction-only braking 535, as shown. In this way, the deceleration module 230 adds regenerative braking to compensate for brake wear of the friction brakes 280.

At 440, the deceleration module 230 monitors for a control input to decelerate the vehicle 100. In one embodiment, the control input is either a signal generated from depressing a brake pedal or from releasing the accelerator. In either case, the deceleration module 230 proceeds to block 450 upon detecting the control input.

At 450, the deceleration module 230 controls the vehicle 100 to decelerate according to the deceleration pattern 250. In one embodiment, the deceleration module 230 provides control signals to the braking system 142 to control the regenerative brakes 270 and the friction brakes 280 according to the deceleration pattern 250. In this way, the adaptive control system 170 controls braking of the vehicle 100 to compensate for wear of the friction brakes and/or to modify use of the regenerative brakes 270 to account for a braking style of the driver and improve brake life of the friction brakes 280.

In still a further embodiment, at 450, the deceleration module 230 may monitor the friction brakes 280, when active for brake slippage due to wear, moisture on the brake pads/rotors, or other circumstances that cause the friction brakes to slip thereby unexpectedly reducing braking torque. Accordingly, when the deceleration module 230 detects the brake slippage during operation at 450 from feedback (e.g., fluctuation in brake line pressure, etc.) within the braking system 142, the deceleration module 230, in one embodiment, dynamically compensates for the slippage by increasing an amount of regenerative braking provided by the regenerative brakes 270. In this way, the adaptive control system 170 can dynamically adjust the braking during a braking event to account for various circumstances affecting the friction brakes 280.

FIG. 1 will now be discussed in full detail as an example environment within which the system and methods disclosed herein may operate. In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle along a travel route using one or more computing systems to control the vehicle with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle along a travel route.

In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

Furthermore, the vehicle 100 has, for example, a forward/bow end 101 and a rearward/aft/stern end 102. The vehicle 100 has an associated longitudinal axis 103, which can be the central axis of the vehicle 100. The vehicle 100 has an associated longitudinal direction 104. "Longitudinal direction" means any direction that is substantially parallel to and/or co-linear with the longitudinal axis 103. The vehicle 100 has an associated lateral axis 105, which can be substantially perpendicular to the longitudinal axis 103. Additionally, as used herein, a driver's side of the vehicle 100 refers to a port side or left side of the vehicle 100 as viewed from within the vehicle while facing a direction of travel. Moreover, a passenger's side refers to a right-hand side or starboard side of the vehicle. As used herein, the term "substantially" includes exactly the term it modifies and slight variations therefrom. Thus, the term "substantially perpendicular" means exactly perpendicular and slight variations therefrom. In this particular example, slight variations therefrom can include within normal manufacturing tolerances, within about 10 degrees or less, within about 5 degrees or less, within about 4 degrees or less, within about 3 degrees or less, within about 2 degrees or less, or within about 1 degree or less. The vehicle 100 can have an associated lateral direction 106. "Lateral direction" means any direction that is substantially parallel to and/or co-linear with the lateral axis 105.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface. The terrain map(s) 117 can be high quality and/or highly detailed.

In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that the vehicle 100 is equipped with, including the capabilities and other information about such sensors. As will be explained below, the vehicle 100 can include a sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100. The map data 116 and/or the sensor data 119 can be obtained by the vehicle 100 from any suitable source, including a sensor manufacturer, the vehicle manufacturer, and/or based on test data, just to name a few possibilities.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described.

The sensor system 120 can include one or more vehicle sensors 121. The vehicle sensor(s) 121 can be configured to detect, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer (not shown). The speedometer can determine a current speed of the vehicle 100, or data acquired by the speedometer can be used to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect and/or sense other things in the external environment of the vehicle 100, such as, for example, lane markers, signs, traffic lights, traffic signs, lane lines, crosswalks, curbs proximate the vehicle 100, off-road objects, etc. In one or more arrangements, the one or more environment sensors 122 can include a global navigation satellite system (GNSS), a global positioning system (GPS), a navigation system (which can be the navigation system 147 described below), and/or other suitable sensors.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123. "Radar sensor" means any device, component and/or system that can detect and/or sense something using at least radio signals. The one or more radar sensors 123 can be configured to detect, and/or sense, directly or indirectly, the presence of one or more obstacles in the external environment of the vehicle 100, the position of each detected obstacle relative to the vehicle 100, the distance between each detected obstacle and the vehicle 100 in one or more directions (e.g. in the longitudinal direction 104, the lateral direction 106 and/or other direction(s)), the elevation of each detected obstacle, the speed of each detected obstacle and/or the movement of each detected obstacle.

In one or more arrangements, the sensor system 120 can include one or more sonar sensors 125. "Sonar sensor" means any device, component and/or system that can detect, and/or sense something using at least sound waves. The sensor system 120 can include can include one or more cameras 126. "Camera" includes any device(s), component(s), and/or system(s) that is configured to capture visual data. "Visual data" includes video and/or image information/data.

The sensor system 120, the processor(s) 110, and/or one or more other elements of the vehicle 100 can be operable to control movements of one or more of the sensors of the sensor system 120. It should be noted that any of the sensors described herein can be provided in any suitable location with respect to the vehicle 100. For instance, one or more sensors can be located within the vehicle 100, one or more sensors can be located on the exterior of the vehicle 100, and/or one or more sensors can be located so as to be exposed to the exterior of the vehicle 100.

The sensor system 120 can include one or more ranging sensors. "Ranging sensors" include sensors that can detect, and/or sense obstacles from a distance and do not require physical contact with the obstacle. The various environment sensors 122 described above are examples of ranging sensors. Alternatively, or in addition to one or more of the above examples, one or more sensors can be configured to detect, and/or sense the location of the vehicle 100 and/or the location of obstacles in the environment relative to the vehicle 100. Any suitable sensor can be used for such purposes. Such sensors may work independently and/or in combination with a positioning system of the vehicle 100.

It should be noted that the environment sensors 122 can send outbound sensor signals into the external environment of the vehicle 100 and can receive return sensor signals, which may reflect off of obstacles located in the external environment. Differences between the outbound sensor signals and their corresponding return sensor signals, as well as other information, can be used for detection purposes in any suitable manner, now known or later developed.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). Any suitable input system 130 can be used, including, for example, a keypad, display, touch screen, multi-touch screen, button, joystick, mouse, trackball, microphone and/or combinations thereof.

The vehicle 100 can include an output system 135. An "output system" includes any device, component, system, element or arrangement or groups thereof that enable information/data to be presented to a vehicle passenger (e.g. a person, a vehicle passenger, etc.). The output system 135 can present information/data to a vehicle passenger. The output system 135 can include a display. Alternatively, or in addition, the output system 135 may include a microphone, earphone, and/or speaker. Some components of the vehicle 100 may serve as both a component of the input system 130 and a component of the output system 135.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the adaptive control system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the adaptive control system 170, and/or the autonomous driving module(s) 160 may control some or all of these vehicle systems 140 and, thus, may be partially or fully autonomous.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-2, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An adaptive control system of a vehicle that includes both regenerative brakes and friction brakes, comprising:
   one or more processors;
   a memory communicably coupled to the one or more processors and storing:
   a brake wear module including instructions that when executed by the one or more processors cause the one or more processors to identify whether brake wear of at least one of the friction brakes satisfies a threshold for modifying a deceleration pattern of the vehicle, wherein the deceleration pattern indicates how the regenerative brakes and the friction brakes are engaged to decelerate the vehicle individually for each wheel of the vehicle, and
   wherein the deceleration pattern indicates at least an amount of simultaneous blending between using the friction brakes and using the regenerative brakes to decelerate the vehicle; and
   a deceleration module including instructions that when executed by the one or more processors cause the one or more processors to adjust, prior to receiving a control input to activate braking in the vehicle, the deceleration pattern according to at least the brake wear of the at least one of the friction brakes to transition braking from the at least one of the friction brakes to the regenerative brakes, and
   wherein the deceleration module includes instructions to control the vehicle to decelerate according to the deceleration pattern upon receiving a control input.

2. The adaptive control system of claim 1, wherein the brake wear module further includes instructions to determine the brake wear associated with the friction brakes of the vehicle including instructions to compute a degree of wear for at least brakes pads of the friction brakes after each braking event in the vehicle,
   wherein the deceleration module includes instructions to adjust the deceleration pattern to cause at least one of the regenerative brakes to be activated at least partially in place of the at least one of the friction brakes to compensate for the brake wear, and
   wherein the control input is a signal generated from depressing a brake pedal or from releasing an accelerator pedal of the vehicle.

3. The adaptive control system of claim 2, wherein the brake wear module includes instructions to determine the brake wear for the at least one friction brake including instructions to:
   in response to detecting a braking event where the friction brakes are engaged to decelerate the vehicle, collect braking data that includes at least a brake stroke applied to the brake pedal of the vehicle,
   analyze the braking event as a function of at least the braking data to generate an intermediate brake wear that identifies wear caused by the braking event for each of the friction brakes, and generate the degree of wear by accumulating the intermediate brake wear with a previous degree of wear that is from prior to the braking event for each of the friction brakes.

4. The adaptive control system of claim 3, wherein the brake wear module includes instructions to collect the braking data including instructions to receive a control signal from a brake wear sensor that indicates a thickness of a brake pad for each of the friction brakes, receive a signal identifying an ambient air temperature, receiving a signal identifying the brake stroke and a duration of the brake stroke, and retrieving an age of the friction brakes from a register, and wherein the brake wear module includes instructions to analyze the braking event including instructions to input the braking data to a lookup table to retrieve an estimated value for the intermediate brake wear for the braking event.

5. The adaptive control system of claim 3, wherein the brake wear module includes instructions to provide an indication according to the intermediate brake wear that identifies to a driver an effect of the braking event on brake life of the friction brakes.

6. The adaptive control system of claim 1, wherein the deceleration pattern further indicates a lower threshold speed of the vehicle at which the regenerative brakes are disengaged and the friction brakes are used to decelerate the vehicle, and an extent to which the regenerative brakes are engaged when coasting, and wherein the deceleration module includes instructions to adjust the deceleration pattern including instructions to adjust a coaching system of the vehicle according to the deceleration pattern to provide indications to a driver to permit the vehicle to coast and use the regenerative brakes in place of applying the friction brakes.

7. The adaptive control system of claim 1, wherein the deceleration module includes instructions to adjust the deceleration pattern including instructions to engage the regenerative brakes according to an amount that correlates with the brake wear and a decrease in an effectiveness of the friction brakes caused by the brake wear to slow the vehicle using the regenerative brakes instead of the friction brakes, wherein the deceleration module includes instructions to adjust the deceleration pattern including instructions to modify one or more of (i) an amount by which the regenerative brakes are engaged during coasting of the vehicle, (ii) an amount by which the regenerative brakes are applied during the blending, and (iii) an amount by which the friction brakes are applied separately from the regenerative brakes, and wherein the deceleration module includes the instructions to control the vehicle to brake according to the deceleration pattern including instructions to engage the regenerative brakes for a duration and a degree specified by the deceleration pattern.

8. The adaptive control system of claim 1, wherein the brake wear of the at least one of the friction brakes satisfies the threshold when the brake wear affects an ability of the at least one of the friction brakes to decelerate the vehicle, wherein the brake wear module includes the instructions to determine the brake wear including instructions to individually identify the brake wear separately for each of the friction brakes, and wherein the deceleration module includes instructions to adjust the deceleration pattern individually for each of the friction brakes and the regenerative brakes.

9. The adaptive control system of claim 1, wherein the vehicle is a hybrid electric vehicle, and wherein the friction brakes are disc brakes each comprising a brake pad in contact with a brake rotor when actuated to decelerate the vehicle.

10. A non-transitory computer-readable medium storing instructions that when executed by one or more processors cause the one or more processors to:

identify, for a vehicle that includes both friction brakes and regenerative brakes, whether brake wear of at least one of the friction brakes satisfies a threshold for modifying a deceleration pattern of the vehicle, wherein the deceleration pattern indicates how the regenerative brakes and the friction brakes are engaged to decelerate the vehicle individually for each wheel of the vehicle, and wherein the deceleration pattern indicates at least an amount of simultaneous blending between using the friction brakes and using the regenerative brakes to decelerate the vehicle;

adjust, prior to receiving a control input to activate braking in the vehicle, the deceleration pattern according to at least the brake wear of the at least one of the friction brakes to transition braking from the at least one of the friction brakes to the regenerative brakes; and control the vehicle to decelerate according to the deceleration pattern upon receiving a control input.

11. The non-transitory computer-readable medium of claim 10, further comprising instructions to determine the brake wear associated with the friction brakes of the vehicle including instructions to compute a degree of wear for at least brakes pads of the friction brakes after each braking event in the vehicle including instructions to:

in response to detecting a braking event where the friction brakes are engaged to decelerate the vehicle, collect braking data that includes at least a brake stroke applied to a brake pedal of the vehicle, analyze the braking event as a function of at least the braking data to generate an intermediate brake wear that identifies wear caused by the braking event for each of the friction brakes, and generate the degree of brake wear by accumulating the intermediate brake wear with a previous degree of brake wear that is from prior to the braking event for each of the friction brakes.

12. The non-transitory computer-readable medium of claim 10, wherein the instructions to adjust the deceleration pattern include instructions to cause at least one of the regenerative brakes to be activated at least partially in place of the at least one of the friction brakes to compensate for the brake wear, wherein the control input is a signal generated from depressing a brake pedal or from releasing an accelerator pedal of the vehicle, wherein the deceleration pattern indicates an amount of blending between using the friction brakes and using the regenerative brakes to decelerate the vehicle, a lower threshold speed of the vehicle at which the regenerative brakes are disengaged, and the friction brakes are used to decelerate the vehicle, and an extent to which the regenerative brakes are engaged when coasting, and wherein the instructions to adjust the deceleration pattern include instructions to adjust a coaching system of the vehicle according to the deceleration pattern to provide indications to a driver to permit the vehicle to coast and use the regenerative brakes in place of applying the friction brakes.

13. The non-transitory computer-readable medium of claim 10, wherein the instructions to adjust the deceleration pattern include instructions to engage the regenerative brakes according to an amount that correlates with the brake wear and a decrease in an effectiveness of the friction brakes caused by the brake wear to slow the vehicle using the regenerative brakes instead of the friction brakes, wherein the instructions to control the vehicle to brake according to the deceleration pattern include instructions to engage the regenerative brakes for a duration and a degree specified by the deceleration pattern, wherein the instructions to adjust the deceleration pattern include instructions to modify one or more of (i) an amount by which the regenerative brakes are engaged during coasting of the vehicle, (ii) an amount by which the regenerative brakes are applied during the blending, and (iii) an amount by which the friction brakes are applied separately from the regenerative brakes, and wherein the brake wear of the at least one of the friction brakes satisfies the threshold when the brake wear affects an ability of the at least one of the friction brakes to decelerate the vehicle.

14. A method of adapting braking in a vehicle that includes both regenerative brakes and friction brakes, comprising:

identifying whether brake wear of at least one of the friction brakes satisfies a threshold for modifying a deceleration pattern of the vehicle, wherein the deceleration pattern indicates how the regenerative brakes and the friction brakes are engaged to decelerate the vehicle individually for each wheel of the vehicle, and wherein the deceleration pattern indicates at least an amount of simultaneous blending between using the friction brakes and using the regenerative brakes to decelerate the vehicle;

adjusting, prior to receiving a control input to activate braking in the vehicle, the deceleration pattern according to at least the brake wear of the at least one of the friction brakes to transition braking from the at least one of the friction brakes to the regenerative brakes; and controlling the vehicle to decelerate according to the deceleration pattern upon receiving a control input.

15. The method of claim 14, further comprising:

determining the brake wear associated with the friction brakes of the vehicle by computing a degree of wear for at least brakes pads of the friction brakes after each braking event in the vehicle, wherein adjusting the deceleration pattern causes at least one of the regenerative brakes to be activated at least partially in place of the at least one of the friction brakes to compensate for the brake wear, wherein the control input is a signal generated from depressing a brake pedal or from releasing an accelerator pedal of the vehicle.

16. The method of claim 15, wherein determining the brake wear for the friction brakes includes:

in response to detecting a braking event where the friction brakes are engaged to decelerate the vehicle, collecting braking data that includes at least a brake stroke applied to the brake pedal of the vehicle, analyzing the braking event as a function of at least the braking data to generate an intermediate brake wear that identifies wear caused by the braking event for each of the friction brakes, and generating the degree of wear by accumulating the intermediate brake wear with a previous degree of wear that is from prior to the braking event for each of the friction brakes.

17. The method of claim 16, further comprising:

providing an indication according to the intermediate brake wear that identifies to a driver an effect of the braking event on brake life of the friction brakes, wherein collecting the braking data includes receiving a control signal from a brake wear sensor that indicates a thickness of a brake pad for each of the friction brakes, receiving a signal identifying an ambient air temperature, and retrieving an age of the friction brakes from a register, and wherein analyzing includes using the braking data as an input to a lookup to retrieve an estimate of the brake wear for the braking event.

18. The method of claim 14, wherein the deceleration pattern further indicates a lower threshold speed of the vehicle at which the regenerative brakes are disengaged and the friction brakes are used to decelerate the vehicle, and an extent to which the regenerative brakes are engaged when coasting, and wherein adjusting the deceleration pattern includes adjusting a coaching system of the vehicle according to the deceleration pattern to provide indications to a driver to permit the vehicle to coast and use the regenerative brakes in place of applying the friction brakes.

19. The method of claim 14, wherein adjusting the deceleration pattern includes engaging the regenerative brakes according to an amount that correlates with the brake wear and a decrease in an effectiveness of the friction brakes caused by the brake wear to slow the vehicle using the regenerative brakes instead of the friction brakes, wherein adjusting the deceleration pattern includes modifying one or more of (i) an amount by which the regenerative brakes are engaged during coasting of the vehicle, (ii) an amount by which the regenerative brakes are applied during the blending, and (iii) an amount by which the friction brakes are applied separately from the regenerative brakes, and wherein controlling the vehicle to brake according to the deceleration pattern includes engaging the regenerative brake for a duration and a degree specified by the deceleration pattern.

20. The method of claim 14, wherein the brake wear of the at least one of the friction brakes satisfies the threshold when the brake wear affects an ability of the at least one of the friction brakes to decelerate the vehicle, wherein determining the brake wear includes individually identifying the brake wear separately for each of the friction brakes, and wherein adjusting the deceleration pattern includes individually adjusting the deceleration pattern for each of the friction brakes and the regenerative brakes.

* * * * *